United States Patent [19]  [11]  4,445,542
Fouss et al.  [45]  May 1, 1984

[54] ARCH END CAP

[75] Inventors: James L. Fouss; John J. Parker, both of Findlay, Ohio

[73] Assignee: Hancor, Inc., Findlay, Ohio

[21] Appl. No.: 323,410

[22] Filed: Nov. 20, 1981

[51] Int. Cl.$^3$ .................. F16L 55/10; E02B 11/02
[52] U.S. Cl. .................................. 138/94; 405/42; 405/174
[58] Field of Search ............... 138/89, 94, 119, 121, 138/173, 92, 103, 109; 405/42, 49, 174; 220/307, DIG. 19

[56] References Cited
U.S. PATENT DOCUMENTS
4,029,128  6/1977  Yamagishi ........................ 138/89

FOREIGN PATENT DOCUMENTS
WO80/01196  6/1980  PCT Int'l. Appl. .

Primary Examiner—Stephen Marcus
Assistant Examiner—Mark John Thronson
Attorney, Agent, or Firm—Fay & Sharpe

[57] ABSTRACT

An end cap particularly adapted for capping an arch conduit is provided. The end cap is comprised of an arch body including opposed arcuate side walls integrally joined together at an apex area. Opposed arcuate end walls are integrally joined at the terminal ends of the side walls and the apex area. A plurality of protruding ribs are disposed circumferentially of the end cap and are interrupted at the apex area to provide a relatively smooth, non-ribbed area. The ribs taper towards the apex area and towards rounded base areas of the side walls.

A method is disclosed for capping a continuous arch conduit line comprising halting the subterranean installation of the conduit line at a place generally designated for capping; providing an opening in a wall portion of the line for insertion of the end cap; inserting the end cap in the line through the opening in mating cross-sectional alignment with the line; continuing installation of the line at least until the end cap is installed below ground; and, severing the line to form a terminal end.

22 Claims, 6 Drawing Figures

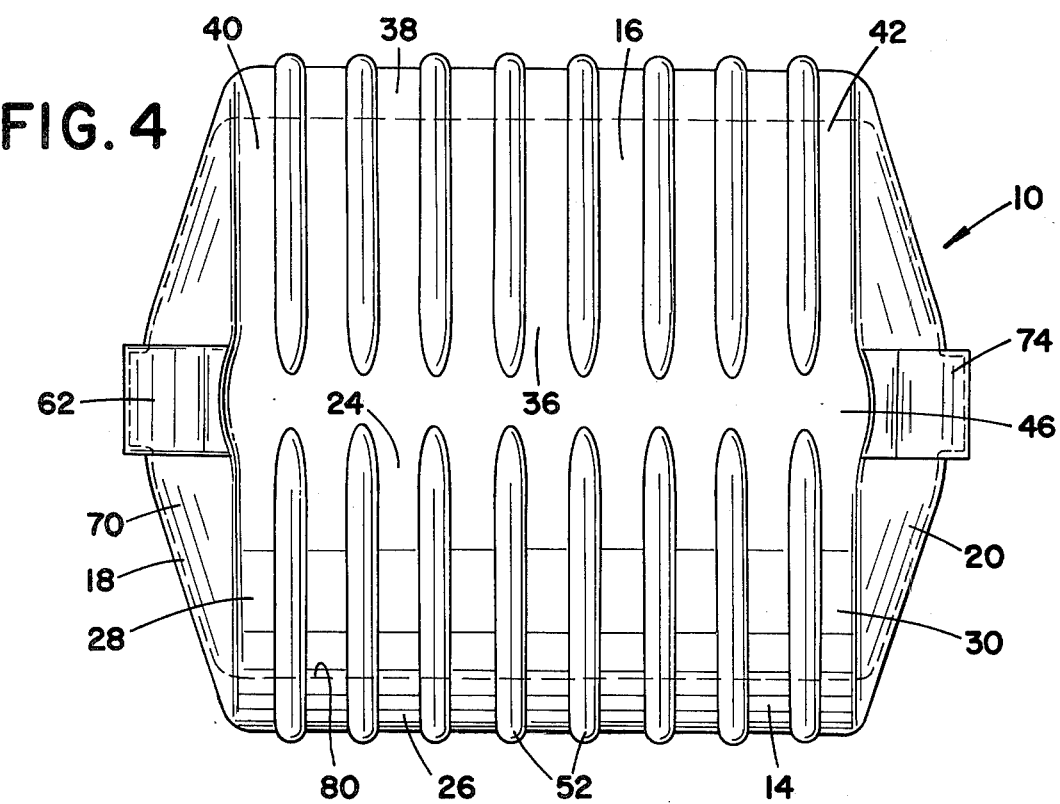
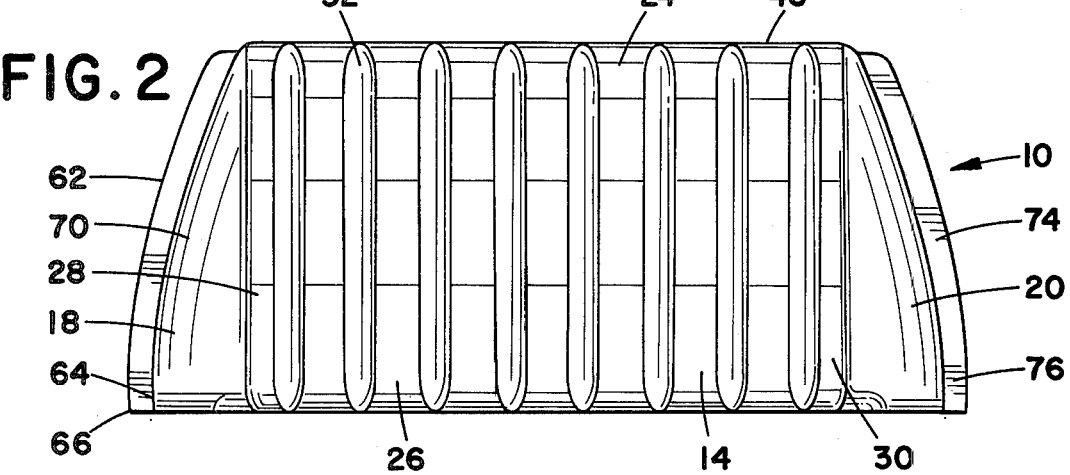
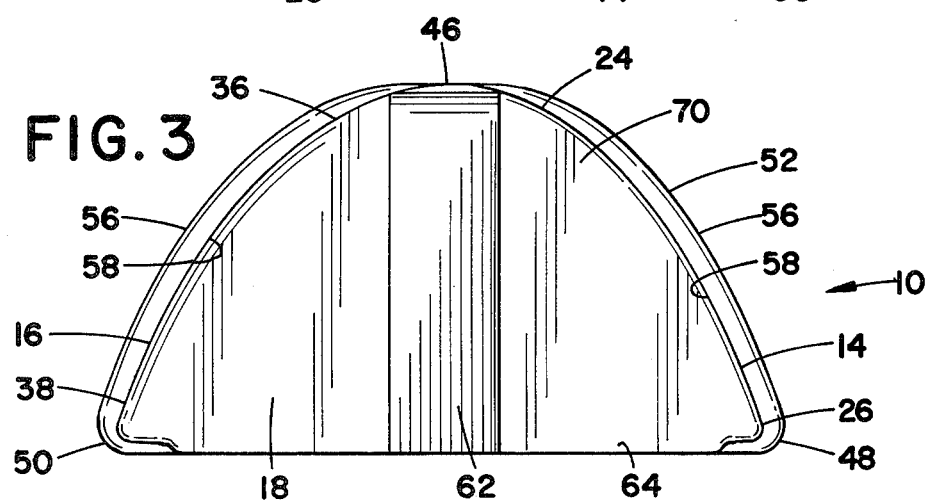

ARCH END CAP

BACKGROUND OF THE INVENTION

The invention pertains to the art of conduit fittings and more particularly to an end cap fitting.

The invention is particularly applicable to an end cap for obstructing the passageway of a conduit and, more particularly, to an arched plastic drainage conduit typically used in the agricultural drainage industry. However, it will be appreciated to those skilled in the art that the invention could be readily adapted for use in other environments as, for example, where similar conduit fitting devices are employed to cap or obstruct passageways.

Upon installation of a conduit line in a subterranean location, it is desirable to cap the terminal end of the line to obstruct the ingress of ambient materials such as sand, gravel, clay, or other soil materials and to further obstruct the conduit passageways to small animals which can cause particular damage to the conduit. Most conventional drainage conduits are generally circular in cross section and capping is typically accomplished by enclosing the line terminal end with a circular fitting which is received either in the conduit line or on and around the peripheral walls of the end of the conduit line.

Typically, these prior end cap fittings for plastic corrugated tubing have variously comprised cup-shaped members similarly formed from plastics.

Prior externally fitted end cap fittings have suffered from a number of inherent problems. Separation of the end cap from the conduit line has chiefly occurred due to the substantial difference between the outside diameter of the end cap and the outside diameter of the conduit line which results in a jutting protrusion normal to the surface of the line that has been particularly susceptible to receiving axial forces. The protrusion has also precluded the use of automatic installation devices to install the terminal end of the line below ground because of the likelihood of separation of the cap from the line during passage through the conduit installation device. Such installation must therefore be manually performed at the subterranean location.

An additional problem resides in the fact that the line must be completely separated from the feeding roll of tubing to attach the end cap. An interruption in the line typically causes an interruption in the continuous feed of conduit to an installation device. The installation device must therefore be manually refed the terminal end of the roll for a new line of tubing to be installed.

Prior internally fitted end caps have similarly variously suffered from the installation problem of causing an interruption in the conduit line necessitating a manual refeed of the installation device.

The present invention contemplates a new and improved device which overcomes all of the above referred to problems and others to provide a new arch end cap fitting which is simple in design, economical to manufacture, readily adaptable for use with an arch conduit having a variety of dimensional characteristics, easy to install, and which provides improved capping for protection against environmental harzards.

BRIEF SUMMARY OF THE INVENTION

In accordance with the present invention there is provided an end cap for an arch conduit comprising a first arcuate side wall, a second arcuate side wall, a one end wall, and an other end wall. The first arcuate side wall has a first apex area, a first base area, a first one terminal end area, and a first other terminal end area. The second arcuate side wall has a second apex area, a second base area, a second one terminal end area, and a second other terminal end area. The first apex area and the second apex area are joined to form an end cap apex. The one end wall is joined to the first one terminal end area, the second one terminal end area, and the end cap apex. The one end wall includes a first support stud to increase the structural strength of the one end wall. The other end wall is joined to the first other terminal end area, the second other terminal end area, and the end cap apex. The other end wall includes a second support stud to increase the structural strength of the other end wall. The end cap is adapted to be received in the arch conduit for obstructing the arch conduit passageway.

In accordance with another aspect of the present invention, the first arcuate side wall and the second arcuate side wall include a plurality of protruding ribs extending from the first base area to the first apex area and from the second base area to the second apex area whereby the ribs are configured to be closely received in mating corrugations of the arch conduit.

In accordance with a more limited aspect of the present invention, the ribs are tapered towards the end cap first base area, the end cap second base area, and the end cap apex.

In accordance with the present invention there is provided an article for obstructing an arch conduit comprising an arched body adapted for close abutting engagement with an inner side wall surface of the arch conduit, a first end wall at one end of the body and a second end wall at the other end of the body.

In accordance with another aspect of the present invention, the body includes opposed arcuate side walls joined at an apex area.

In accordance with a further aspect of the present invention, the side walls have base areas including rounded terminal ends.

In accordance with yet another aspect of the present invention, the end walls are arcuately configured and are foldable from the base area terminal ends towards the apex area of the article.

In accordance with the present invention, there is provided a method for installing an arch end cap in a continuous arch conduit line. The method comprises the steps of halting the subterranean installation of the arch conduit line at a place generally designated for capping the line; providing an opening in a wall portion of the line for insertion of the end cap; inserting the end cap in the line through the opening in mating cross-sectional alignment with the line; continuing installation of the line at least until the place is installed; and, severing the line to form a terminal end of the line after the place for capping whereby the line is capped and installed.

In accordance with another aspect of the present invention, the providing an opening comprises cutting a base wall of the line to form a yieldable flap.

One benefit obtained by use of the present invention is an arch end cap which obstructs the passageway of an arch conduit.

Another benefit obtained from the present invention is an arch end cap which is installed wholly internal of the arch conduit.

A further benefit of the present invention is a method for installing an arch end cap which obviates manually refeeding an installation device after capping a terminal end of a line or manually installing the end cap at a subterranean location.

Other benefits and advantages for the subject new arch end cap will become apparent to those skilled in the art upon a reading and understanding of this specification.

BRIEF DESCRIPTION OF THE DRAWINGS

The invention may take physical form in certain parts and arrangement of parts, the preferred and an alternative embodiment of which will be described in detail in the specification and illustrated in the accompanying drawings which form a part hereof and wherein:

FIG. 2 is a side elevational view of the device shown in FIG. 1;

FIG. 3 is an end elevational view of the device shown in FIG. 1;

FIG. 4 is a top plan view of the device of FIG. 1; and

DETAILED DESCRIPTION OF THE INVENTION

Figure 5:
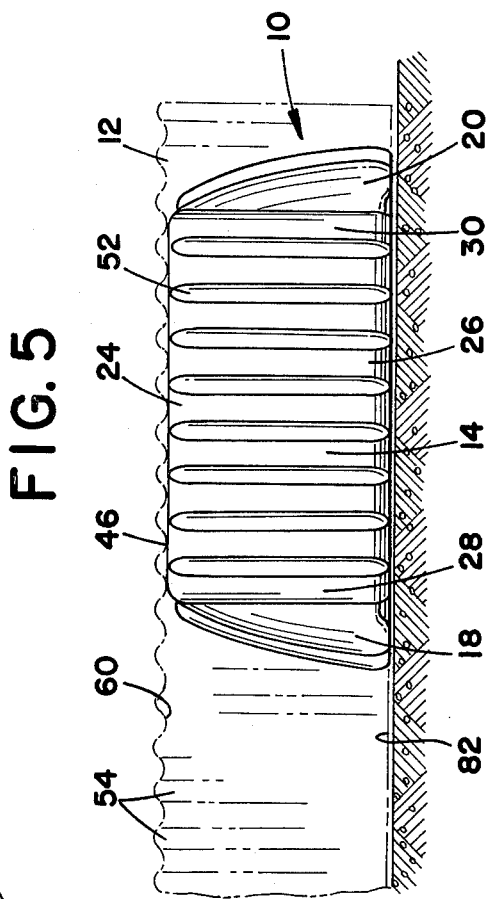
FIG. 5 is an elevational view of an end cap formed in accordance with the present invention showing it in position, internally fitted in an arch conduit; and, FIG. 6 is a perspective view in partial section of an alternative embodiment of the present invention.
Figure 1:
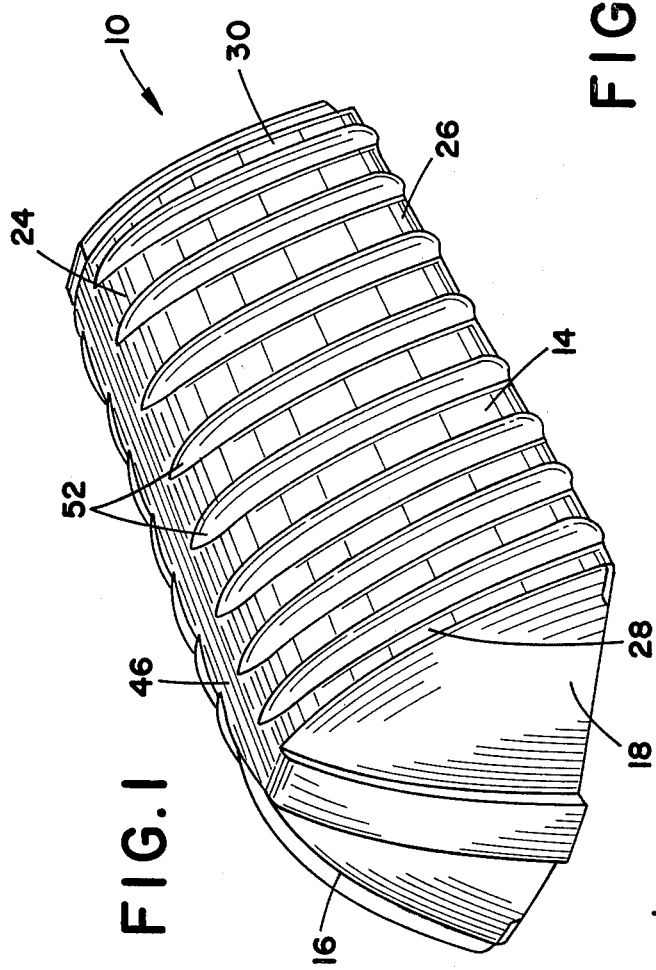
FIG. 1 is a perspective view of an arch end cap formed in accordance with the present invention.

Referring now to the drawings wherein the showings are for purposes of illustrating the preferred and an alternative embodiment of the invention only and not for purposes of limiting same, the Figures show an arch end cap 10 particularly suited for insertion into an arch conduit 12 (FIG. 5) for obstructing the internal passageway of the arch conduit 12.

More specifically and with reference to FIGS. 1-4, arch end cap 10 is comprised of an arch body adapted for close abutting engagement with an inner side wall surface of an arch conduit 12. The end cap 10 is preferably constructed of a thermoplastic material such as ABS or other styrene polymers, polyethylene, or the like. However, rather types of plastics and materials can be advantageously employed without departing from the overall intent or scope of the invention.

The end cap 10 generally includes a first arcuate side wall 14, a second arcuate side wall 16, an arcuate one end wall 18, and an arcuate other end wall 20. The first arcuate side wall 14 has a first apex area 24, a first base area 26, a first one terminal end area 28 and a first other terminal end area 30. The second arcuate side wall 16 includes a second apex area 36, a second base area 38, a second one terminal end area 40 and a second other terminal end area 42 (FIG. 4). The first apex area 24 and the second apex area 36 are integrally joined to form an end cap apex 46. First base area 26 and second base area 38 include rounded terminal ends 48, 50, respectively (FIG. 3).

Side walls 14, 16 are preferably corrugated to include a plurality of protruding ribs 52 extending from the first base area 26 to the first apex area 24 and from the second base area 38 to the second apex area 36. With reference to FIG. 5, ribs 52 are configured to be closely received in mating corrugations 54 of an arch conduit 12 in which end cap 10 is to be inserted. Preferably, ribs 52 protrude to the greatest extent at an area generally about the middle of side walls 14, 16 and taper towards apex areas 24, 36 and base areas 26, 38. The cross-sectional geometrical configuration is such that the end cap outer wall surface 56 defined by the radial extent of ribs 52 has a generally semi-elliptical or semi-circular contour while the end cap inner wall surface 58 has a generally parabolic cross-sectional configuration or contour. This configuration provides a stronger structure for resisting the forces of a subterranean installation as is more fully disclosed in U.S. Pat. No. 4,245,924 which is hereby included. Alternate rib configurations could also be successfully employed though for mateable alignment and reception in arch conduits of alternate corrugation configurations. End cap apex 46 is devoid of protruding ribs to allow foldability of the end cap along the apex 46 and for close abutment to the apex area 60 of arch conduit 12 (FIG. 5). End cap apex 46 is generally smooth relative to the side walls 14, 16 in that the end cap apex 46 lacks protruding ribs 52.

Arch conduit 12 preferably includes a hinge (not shown) at apex area 60 to provide for folding of the conduit 12 about the hinge. The hinge is an apex area devoid of corrugations or may be defined by a small cut or trough of reduced wall thickness extending the length of the conduit 12. End cap apex 46 preferably does not include a cut or trough, and has a constant wall thickness at apex area 46. However, end cap 10 is constructed of resilient material to allow for flexible movement of the end cap walls 14, 16 about the apex area 46 and thereby allow folding of end cap 10.

Figure 6:
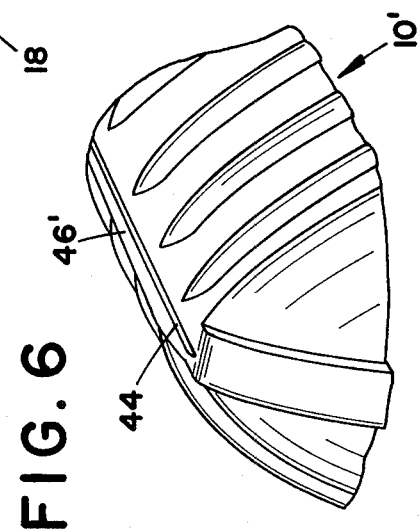

With reference to FIG. 6, it is within the scope of the invention to provide an alternative embodiment which includes a hinge construction 44 comprising a trough of reduced wall thickness at the apex area 46' which would further facilitate folding of end cap 10' for insertion in conduit 12.

With particular reference to FIGS. 2, 3, and 4, opposed end walls 18, 20 are generally transverse to first and second side walls 14, 16 and also are preferably arcuate in configuration. The one end wall 18 is integrally joined to the first one terminal end area 28, the second one terminal end area 40, and the end cap apex 46. The one end wall 18 may include a first support stud 62 extending generally from the one end wall base area 64 to the end cap apex 46; however, a generally smooth end wall could be advantageously employed. A terminal end 66 at the end wall base area 64 is preferably configured to rest near the conduit base wall 82. First stud 62 protrudes from the wall surface 70 to provide improved axial and radial strength to end wall 18 but is resilient and flexible enough to allow for folding of end wall 18 along the stud during folding of end cap 10.

The other end wall 20 is opposed and identical to the one end wall 18 and is integrally joined to the first other terminal end area 30, the second other terminal end area 42, and the end cap apex 46. A second support stud or strut 74 is similarly disposed at other end wall 20 to the first stud 62 at one end wall 18. An other end wall base area 76 is disposed to be substantially near the conduit base wall 82.

Arch end cap 10 includes an open-ended base 80 (FIG. 4). The lack of a base wall at end cap 10 does not weaken the structural integrity of the end cap 10 due to the solid end walls 18, 20 and the supporting struts 62, 74.

Operation

With particular attention to FIG. 5, the improved installation characteristics of the new arch end cap will be specifically discussed.

The invention is preferably employed with foldable arch conduit including a base wall of plastic film 82 as is more fully disclosed in U.S. Pat. No. 4,245,924. The arch conduit 12 is generally dispensed in a continuous fashion from a roll of arch conduit tubing operatively employed with a plow and a subterranean installation device or feeder as illustrated in application Ser. No. 227,237 entitled "Apparatus for Inserting Foldable Conduit Below Ground". At a place in the conduit line generally designated for capping the arch conduit tubing, the subterranean installation of the arch line is halted. At a point above the feeding apparatus an opening is provided in a wall portion of the conduit line to allow for insertion of the end cap into the line. Preferably, a yieldable flap (not shown) is cut into the conduit base film 82. The flap is three-sided to be pulled away from the conduit line to allow ready insertion of the end cap 10 into the internal passageway of the conduit line. The end cap 10 is inserted into the conduit 12 through the opening and positioned in mating cross-sectional alignment with the conduit 12. Ribs 52 are matably received in the protruding peaks of corrugations 54 of conduit 12. Preferably, the end cap 10 is inserted down the conduit passageway past the yieldable flap such that the end wall base areas 64, 76 are in contact with the conduit base 82. The end cap is thus positioned to obstruct the conduit passageway.

Conduit 12 is typically in a somewhat folded arrangement as it is dispensed from a reel and before entering the installation device. To provide for insertion into the conduit 12, end cap 10 must similarly be in a somewhat folded arrangement. The degree of resilient flexibility at end cap apex 46 and along support struts 62,74 is such that the end cap 10 may be manually compressed into the necessary folded configuration for insertion into the conduit 12.

After insertion, automatic installation of the conduit line is continued at least until the end cap and conduit are properly positioned below ground. An automatic severing knife included in the installation device is then employed to sever the conduit line to form a terminal end. Severing occurs at a point where the installation device need not be manually refed. The plow and installation device may then be lifted from the ground and moved to another location for immediately continuing installation of the conduit.

The invention has been described with reference to the preferred embodiment. Obviously, modifications and alterations will occur to others upon the reading and understanding of the specification. It is our intention to include all such modifications and alterations insofar as they come within the scope of the appended claims or the equivalents thereof.

Having thus described our invention, we now claim:

1. An end cap for an arch conduit comprising:
a first arcuate side wall having a first apex area, a first base area, a first one terminal end area and a first other terminal end area;
a second arcuate side wall having a second apex area, a second base area, a second one terminal end area and a second other terminal end area, said first apex area and said second apex area being joined to form an end cap apex;
a one end wall joined to said first one terminal end area, said second one terminal end area, and said end cap apex, said one end wall having a one end wall base area; and,
an open-ended base defined adjacent the first base area, the second base area, and the one end wall base area, whereby said end cap is adapted to be received into said arch conduit for obstructing said arch conduit.

2. The end cap as described in claim 1 further including an other end wall joined to said first other terminal end area, said second other end area, and said end cap apex and terminating adjacent the open-ended base in an other end wall base area.

3. The end cap as described in claim 1 wherein said first arcuate side wall and said second arcuate side wall include a plurality of protruding ribs extending from said first base area to said first apex area and from said second base area to said second apex area whereby said ribs are configured to be closely received in mating corrugations of said arch conduit.

4. The end cap as described in claim 3 wherein said ribs are equally spaced and tapered towards said end cap apex.

5. The end cap as described in claim 4 wherein said end cap apex is non-ribbed.

6. The end cap as described in claim 3 wherein said ribs are tapered towards said end cap first base area and said end cap second base area.

7. The end cap as described in claim 1 wherein said first and second side walls are constructed from corrugated plastic.

8. The end cap as described in claim 2 wherein said first and second side walls have opposed arcuate configurations generally transverse to said one and other end walls and wherein said one and other end walls are arcuately configured.

9. The end cap as described in claim 1 wherein said end cap apex area is flexible for allowing folding of said end cap about said apex area.

10. The end cap as described in claim 9 wherein said end cap apex includes a hinge extending along the length thereof.

11. The end cap is described in claim 1 wherein an outer wall surface of said first and second side walls has a generally semi-elliptical contour and an inner side wall surface of said first and second side walls has a generally parabolic contour.

12. An end cap for an arch conduit comprising:
a first arcuate side wall including a first apex area, a first base area, a first one terminal end area, and a first other terminal end area;
a second arcuate side wall having a second apex area, a second base area, a second one terminal end area, and a second other terminal end area, said first apex area and said second apex area being joined to form an end cap apex;
a hinge extending along the length of the end cap apex such that the end cap is foldable about the end cap apex; and,
at least one end wall joined to said first one terminal end area, said second one terminal end area, and said end cap apex, whereby said end cap is adapted to be received into said arch conduit for obstructing said arch conduit.

13. The end cap as described in claim 1 wherein said end cap includes an open-ended base.

14. An article for obstructing an arched conduit comprising:
a relatively stiff arched body including an arched body apex area and arched body base areas adapted for close abutting engagement with an inner side wall surface of the arched conduit;

a first arcuately configured, foldable end wall at one end of the arched body, the first end wall including a first end apex area disposed adjacent the arched body apex area and a first end wall base area disposed adjacent the arched body base areas, at least a first strut extending from the end wall base area toward the first end wall apex area; and, a second arcuately configured, foldable end wall at the other end of the arched body, the second end wall including a second end apex area disposed adjacent the arched body apex area and a second end wall base area adjacent the arched body base areas, at least a second strut disposed extending from the second end wall base area toward the second end wall apex area.

15. The article as defined in claim 14 wherein said body includes opposed arcuate side walls joined at a relatively stiff apex area.

16. The article as defined in claim 15 wherein said side walls have base areas including rounded terminal ends.

17. The article as defined in claim 14 wherein said arched body includes a plurality of outwardly extending ribs.

18. The article as defined in claim 17 wherein said ribs are disposed circumferentially to said body and are interrupted at said apex area.

19. The apparatus as defined in claim 18 wherein said ribs are tapered towards said apex area.

20. A capped arched conduit comprising:

a length of arched conduit including an inner arched wall surface and an inner base wall surface;

an end cap disposed within the arched conduit, the end cap including:
 a first arcuate side wall having a first apex area, a first base area, a first one terminal end area and a first other terminal end area,
 a second arcuate side wall including a second apex area, a second base area, a second one terminal end area, and a second other terminal end area, the first and second apex areas being connected to form an end cap apex, the first and second side walls being disposed in abutting engagement with the conduit inner arched wall surface,
 a one end wall joined to the first one terminal end area, the second one terminal end area, and the end cap apex, said one end wall including one end wall base area disposed in abutting engagement with the conduit inner based wall surface,
 an open-ended base defined adjacent the first base area, the second base area, and the one end wall base area;

whereby the end cap is received in the arch conduit for obstructing the flow of fluid therethrough.

21. The capped arched conduit as described in claim 20 wherein the arched conduit is corrugated and said end cap first and second side walls are corrugated for mating engagement with the arched conduit.

22. The capped arched conduit is described in claim 21 wherein said end cap apex is resilient and flexible and the one and other end walls are resilient and flexible for folding about the apex whereby said end cap may be selectively folded for facilitating insertion of said end cap into said arched conduit.

* * * * *